US006539816B2

United States Patent
Kogiso et al.

(10) Patent No.: US 6,539,816 B2
(45) Date of Patent: Apr. 1, 2003

(54) TORQUE DETECTOR

(75) Inventors: Yoshinori Kogiso, Gifu (JP); Koji Ando, Gifu (JP)

(73) Assignee: Kayaba Industry Co., Ltd., Tokyo (JP)

( * ) Notice: Subject to any disclaimer, the term of this patent is extended or adjusted under 35 U.S.C. 154(b) by 0 days.

(21) Appl. No.: 09/792,580

(22) Filed: Feb. 23, 2001

(65) Prior Publication Data
US 2002/0157481 A1 Oct. 31, 2002

(51) Int. Cl.[7] .................................................. G01L 3/02
(52) U.S. Cl. .................................................. 73/862.334
(58) Field of Search ...................... 73/862.321, 862.322, 73/862.328, 862.329, 862.331, 862.333, 862.324

(56) References Cited

U.S. PATENT DOCUMENTS

| | | | | |
|---|---|---|---|---|
| 4,796,463 A | * | 1/1989 | Tsals et al. ............ | 73/862.332 |
| 4,803,885 A | * | 2/1989 | Nonomura et al. .... | 73/862.333 |
| 4,983,915 A | * | 1/1991 | Rossi .................... | 324/173 |
| 5,029,659 A | * | 7/1991 | Saito ..................... | 73/863.322 |
| 5,521,495 A | * | 5/1996 | Takahashi et al. ..... | 324/207.18 |
| 5,955,806 A | * | 9/1999 | Devenyi ................ | 310/156.26 |
| 6,223,608 B1 | * | 5/2001 | Yasui .................... | 73/862.333 |
| 6,330,833 B1 | * | 12/2001 | Opie et al. ............. | 73/862.333 |

\* cited by examiner

Primary Examiner—Max Noori
(74) Attorney, Agent, or Firm—Steinberg & Raskin, P.C.

(57) ABSTRACT

An object of the present invention is to provide a compact torque detector. The present invention solving the object has a conversion member 23 provided on the outer circumferences of an input shaft 20 and an output shaft 21 to convert the amount of relative rotation of the input and output shafts to a displacement in the axial direction; an annular-shaped ring member 26 secured on the outer circumference of the conversion member 23 and made up of a magnet; and a plurality of magnetically sensitive devices 27 arranged at intervals around the ring member 26 and facing the ring member. The magnetically sensitive device 27 detects the amount of travel of the ring member 26 in the axial direction and supplying the detected amount as a voltage signal to a controller C.

9 Claims, 7 Drawing Sheets

TORQUE DETECTOR

BACKGROUND OF THE INVENTION

1. Field of the Invention

This invention relates to a power steering for applying an assist force using an electric motor, and particularly, to a torque detector for detecting steering torque supplied from a steering wheel.

2. Description of Related Art

Torque detectors for a power steering include, for example, the torque detector disclosed in Japanese Patent Laid-open No. 3-74258 by the present applicant.

Figure 12:
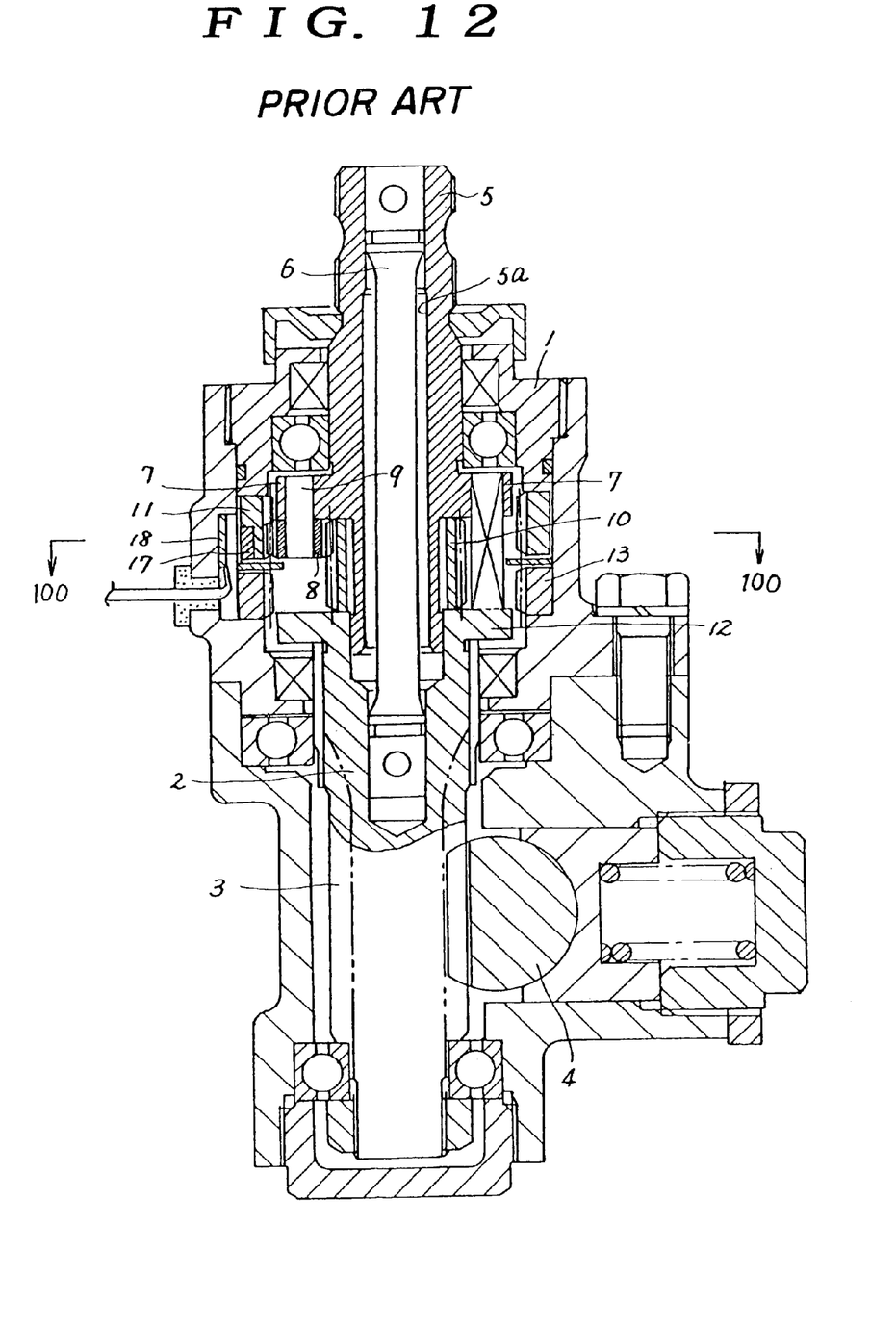
FIG. 12 is a sectional view illustrating a conventional torque detector.
Figure 13:
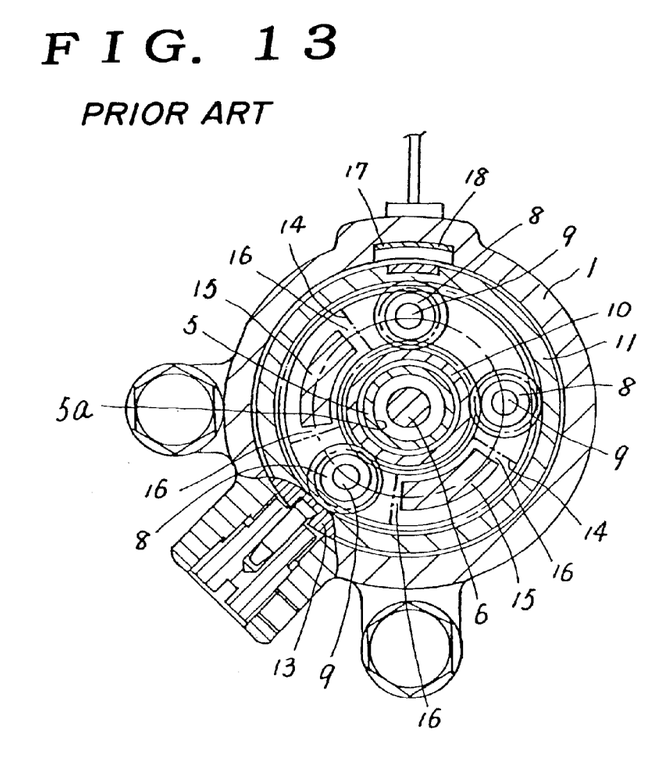
FIG. 13 is a sectional view illustrating the conventional torque detector which is taken along the 100—100 line of FIG. 11.

In the torque detector, as shown in FIG. 12 and FIG. 13, an output shaft 2 is rotatably mounted in a gear case 1 and has an end at which a pinion 3 is provided. The pinion 3 is engaged with a rack shaft 4 having both ends linking with wheels (not shown).

The rack shaft 4 is linked with an electric motor (not shown) for applying an assist force.

In the gear case 1, an input shaft 5 linking with the steering wheel (not shown) is rotatably mounted coaxially with the output shaft 2. A torsion bar 6 is provided in a hollow portion 5a of the input shaft 5, and has one end secured to the input shaft 5 and the other end secured to the output shaft 2.

In the detector constructed as above, upon turning the steering wheel (not shown), the torsion bar 6 is twisted in accordance with the input torque of the turned steering wheel, to cause a relative rotation between the input shaft 5 and the output shaft 2.

A sensor 18 detailed later detects the amount of relative rotation and the direction of the input and output shafts, and a controller (not shown) controls output of the electric motor based on the detected amount and direction.

The electric motor thus controlled by the controller exerts a driving force in accordance with the input torque on the rack shaft 4 to drive the rack shaft 4 for application of an optimum assist force.

Next, the configuration for detecting the input torque will be explained.

A flange 7 is provided on the input shaft 5. In the flange 7, three planetary gears 8 are arranged at regular intervals along the circumferential direction with respective pins 9 as shown in FIG. 13. The planetary gears 8 engage with a sun gear 10 rotatably provided on the outer circumferential face of the input shaft 5 and a rotatable ring gear 11 rotatably mounted in the gear case 1.

Another flange 12 is provided on the output shaft 2, and three planetary gears (not shown) are also arranged at regular intervals along the circumferential direction with respective pins. The planetary gears engage with the sun gear 10 and a fixed ring gear 13 secured in the gear case 1.

In the flange 7 provided on the input shaft 5, two notches 14 are provided as shown in FIG. 13. Protrusions 15 are provided in the flange 12 on the output shaft 2, and respectively inserted into the notches 14.

A clearance 16 is provided between each notch 14 and the corresponding protrusion 15 to allow the input shaft 5 to rotate relative to the output shaft 2 in the circumferential direction. When the notch 14 and the protrusion 15 make contact with each other, the input shaft 5 and the output shaft 2 integrally rotate. This prevents the torsion bar 6 from becoming extremely twisted and thereby damaged.

A magnetic piece 17 is incorporated in a portion of the outer circumference of the aforementioned rotatable ring gear 11. The sensor 18 made up of a magnetic resistor element is provided on the inner surface of the gear case 1 facing the magnetic piece 17.

The magnetic resistor element has a facility in that it varies an electric resistance therein upon reception of external action of magnetic field and detects the resistance variation as a variation of voltage.

The sensor 18 made up of such a magnetic resistor element detects a voltage in accordance with the magnetic flux variation when the magnetic piece 17 is moved by the rotation of the rotatable ring gear 11. The sensor 18 inputs the detected voltage to the controller (not shown) and the controller controls output of the electric motor. The electric motor exerts the assist force in response to signals from the controller to reduce a steering force to an optimal force.

Next, the operation of the conventional torque detector will be explained.

In the state that a load is transmitted from the wheels (not shown) to the rack shaft 4, when the steering wheel (not shown) is turned, the turning force is transmitted to the input shaft 5. However, since the load from the wheels interferes with the rotation of the output shaft 2, the torsion bar 6 is twisted by the rotation of the input shaft 5. Thus, the input shaft 5 and the output shaft 2 are relatively rotated within the range of the clearance 16.

When the input shaft 5 and the output shaft 2 relatively rotate in this way, the rotatable ring gear 11 rotates as follows.

The limitation of the rotation of the output shaft 2 does not allow the planetary gears (not shown) linked with the output shaft 2 to revolve around the sun gear 10. Additionally, the planetary gears (not shown) cannot rotate due to the engagement with the fixed ring gear 13. For those reasons, the sun gear 10 engaging with the planetary gears (not shown) is under the condition that its rotation is limited.

Under such condition, when the input shaft 5 rotates in relation to the output shaft 2, the planetary gears 8 provided in the flange 7 on the input shaft 5 rotate and revolve around the sun gear 10. Therefore, the rotatable ring gear 11 engaging with the planetary gears 8 rotates slightly.

Upon the rotatable ring gear 11 slightly rotating as explained above, the magnetic piece 17 secured in the ring gear 11 also travels. The sensor 18 detects the amount of travel of the magnetic piece 17, and the controller (not shown) controls the electric motor in response to the detected signal. In this way, the electric motor applies an optimum assisting force.

Since the sensor 18 and the magnetic piece 17 are out of contact with each other as explained above, there is no significant influence of wear and the like in use of a contact type sensor. This allows the detection of high accurate values.

On the other hand, when the input shaft 5 and the output shaft 2 integrally rotate while the torsion bar 6 is twisted, the rotatable ring gear 11 is adapted to stop rotating. This situation will be detailed below.

When the input shaft 5 and the output shaft 2 integrally rotate, the planetary gears (not shown) provided on the output shaft 2 side rotate and revolve around the sun gear 10. Therefore, the sun gear 10 engaging with the planetary gears rotates in the same direction as that of the input shaft 5 and output shaft 2.

The planetary gears 8 provided on the input shaft 5 side revolve in the same direction as that of the input shaft 5 and output shaft 2, while being rotated by the rotation of the sun gear 10. That is to say, the planetary gears 8 rotate while revolving around the sun gear 10.

Such planetary gears 8 travel on the inner face of the rotatable ring gear 11 while engaging therewith due to their rotation. The speed of travel of the planetary gear 8 on the rotatable ring gear 11 is set to be equal to the speed of voluntary revolution of the planetary gear 8 around the sun gear 10. In other words, the planetary gears 8 travel on the inner face of the rotatable ring gear 11 with simply engaging therewith such that the rotating force of the planetary gears 8 does not act on the rotatable ring gear 11. Naturally, the rotatable ring gear 11 does not rotate as long as the rotating force of the planetary gears 8 does not act thereon.

The reason for limiting the rotation of the rotatable ring gear 11 as described above is in order to prevent the magnetic piece 17, provided in the rotatable ring gear 11, from departing from the position facing the sensor 18 even in the integral rotation of the input shaft 5 and the output shaft 2.

Specifically, the magnetic piece 17 is provided only in a portion of the outer circumference of the rotatable ring gear 11. Therefore, if the rotatable ring gear 11 rotates integrally with the input shaft 5 and output shaft 2, the magnetic piece 17 naturally departs from the position facing the sensor 18. In this event, there is the disadvantage that a displacement of the rotatable ring gear 11 is impossible to detect.

For this reason, the conventional detector establishes limitation for the rotation of the rotatable ring gear 11 in order that the magnetic piece 17 faces the sensor 18 at all times.

In the above conventional detector, in order to prevent the magnetic piece 17 provided in the rotatable ring gear 11 from departing from the position facing the sensor 18 even when the input shaft 5 and the output shaft 2 integrally rotate, it is needed to provide the planetary gear unit composed of the planetary gears 8, the rotatable ring gear 11 and so on.

However, providing such a planetary gear unit naturally produces a disadvantage of increasing in size of the gear case 1 housing the planetary gear unit.

Further, the power steering device including such torque detector must be placed typically in a very small space between the foot of the driver seat and the engine room. Therefore, if the gear case 1 is increased in size as explained above, this produces a disadvantage in which the detector cannot be mounted depending on the car models or vehicle types.

SUMMARY OF THE INVENTION

It therefore is an object of the present invention to provide a compact torque detector.

A first invention is a torque detector for a power steering, which detects input torque from the amount of relative rotation of an input shaft, linking with a steering wheel, and an output shaft linking with wheels, and supplies the detected signal to a controller, characterized by including: a conversion member provided on the outer circumferences of the input shaft and the output shaft for convert the amount of relative rotation of the input and output shafts to a displacement in the axis direction; an annular-shaped ring member formed of a magnet and secured on the outer circumference of the conversion member; and a plurality of magnetically sensitive devices arranged at intervals around the ring member to oppose each other, in which the magnetically sensitive device detects the amount of travel of the ring member in the axis direction and supplying the detected amount as a voltage signal to the controller.

It should be noted that the magnet in the present invention refers to a magnet generating a magnet flux.

According to the first invention, the conversion member traveling in the axis direction in accordance with the amount of relative rotation of the input shaft and the output shaft is provided with the annular-shaped ring member made up of a magnet. The amount of travel of the ring member in the axis direction is detected by the magnetically sensitive device. The reason for such a configuration is that even when the input shaft and the output shaft integrally rotate, the ring member faces the magnetically sensitive device at all times. Hence, torque can be detected without using the planetary gear unit conventionally, resulting in the reduction in size of the torque detector equal to the space conventionally used for the planetary gear unit.

A second invention is characterized in that the magnetically sensitive devices are connected to a fail detecting mechanism, and the fail detecting mechanism detects a difference between the voltage signals supplied from the magnetically sensitive devices and supplies a fault signal to the controller when the difference exceeds a set value.

According to the second embodiment, when a false signal is input to the controller C because of a failure of the magnetically sensitive device or the like, the fail detecting mechanism supplies a fault signal to the controller, and then the controller stops the electric motor.

Hence, the electric motor does not exert an unexpected assist force.

A third invention is characterized in that a plurality of the magnetically sensitive devices are arranged around the ring member, and the controller averages the detected signals supplied from the magnetically sensitive devices.

According to the third invention, since an average of the detected values supplied from a plurality of the magnetically sensitive devices is found, it is possible to accomplish exact detection of the input torque.

A fourth invention is characterized in that a plurality of the magnetically sensitive devices are arranged at regular intervals in the circumferential direction.

According to the fourth invention, a plurality of the magnetically sensitive devices provided around the ring member are arranged at regular intervals in the circumferential direction. This allows the detection of balanced information, resulting in detection of the input torque with further improved precision.

A fifth invention is characterized in that the conversion member is a tubular member.

According to the fifth invention, since the conversion member is the tubular member that requires a small mounting space, further reduction in size of the torque detector can be accomplished.

A sixth invention is characterized in that the ring member is secured on the tubular member made of metal and a non-magnetic substance is interposed between the tubular member and the ring member.

According to the sixth invention, by interposing the non-magnetic substance between the ring member and the tubular member, it becomes possible to make the tubular member of robust metal.

A seventh invention is a torque detector for a power steering, which detects input torque from the amount of relative rotation of an input shaft linking with a steering wheel and an output shaft linking with wheels and supplies the detected signal to a controller, characterized by including: a conversion member made of up a magnet and provided on the outer circumferences of the input shaft and the output shaft for convert the amount of relative rotation of the input and output shafts to a displacement in the axis direction; a plurality of magnetically sensitive devices arranged at intervals around the conversion member to opposite each other; and a fail detecting mechanism connected to the magnetically sensitive devices, in which the magnetically sensitive device detects the amount of travel of the conversion member in the axis direction and supplying the detected amount as a voltage signal to the controller, while the fail detecting mechanism detect detects a difference between the voltage signals supplied from the magnetically sensitive devices and supplies a fault signal to the controller when the detected difference exceeds a set value.

According to the seventh invention, since the conversion member itself is made up of a magnet, it is unnecessary to additionally provide a ring member to the conversion member. Omitting the ring member enables the reduction of costs.

It should be mentioned that in the sixth invention, the fail detecting mechanism is provided. Therefore, the electric motor does not exert an unexpected assist force.

Since the conversion member is different in shape from those of the ring member, the magnetic flux is also different. However, the controller for detecting the magnetic flux can correct the difference. Accordingly, even in use of the conversion member itself made up of a magnet, precise torque can be detected.

An eighth invention is characterized by further including an adder connected between the magnetically sensitive device and the controller to correct a deviation of an output signal from the magnetically sensitive device in a neutral state.

According to the eighth invention, even when a signal supplied from the magnetically sensitive device in the neutral state is deviated, the deviation can be readily corrected by the adder.

DETAILED DESCRIPTION OF THE PREFERRED EMBODIMENTS

FIG. 1 to FIG. 7 illustrate a first embodiment of a torque detector according to the present invention.

Figure 1:
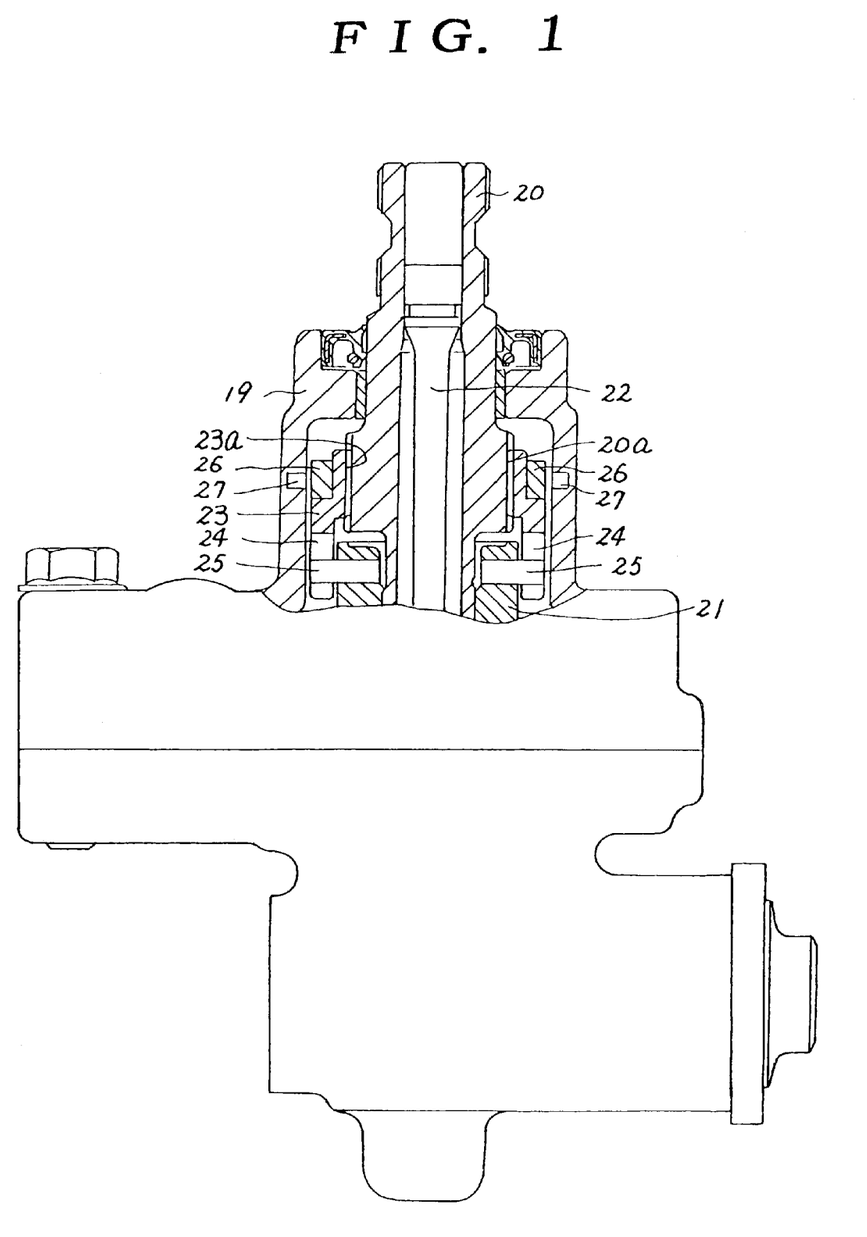
FIG. 1 is a sectional view illustrating a torque detector of a first embodiment according to the present invention.

In a gear case 19 as illustrated in FIG. 1, an input shaft 20 linking with a steering wheel (not shown) is rotatably mounted, while an output shaft 21 is also rotatably mounted coaxially with the input shaft 20. The input shaft 20 and the output shaft 21 are connected with each other through a torsion bar 22.

The output shaft 21 is provided with a rack (not shown) as in the conventional torque detector. The rack is engaged with a rack shaft so as to transmit a driving force of an electric motor thereto.

On the outer circumferences of the input shaft 20 and the output shaft 21, a tubular member 23 made up of a non-magnetic material is slidably provided.

Figure 2:
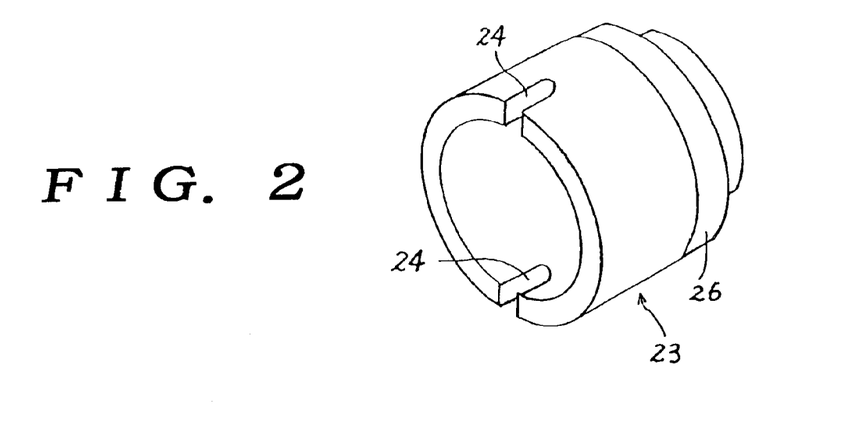
FIG. 2 is a perspective view illustrating a tubular member 23 of the torque detector according to the first embodiment.
Figure 3:
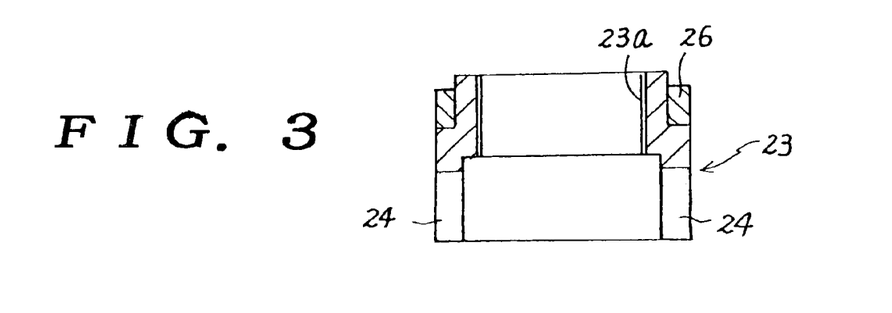
FIG. 3 is a sectional view of the tubular member 23.

The tubular member 23 has a cylindrical shape as illustrated in FIG. 2 and is provided with a screw portion 23a on its inner circumference as illustrated in FIG. 3. The screw portion 23a is screw-coupled with a screw portion 20a provided on the outer circumference of the input shaft 20.

The tubular member 23 is provided with a pair of axial grooves 24 extending in the axis direction at opposite positions shifting in a phase of 180 degrees from each other. In the respective axial grooves 24, pins 25 secured to the output shaft 21 are slidably fitted. This construction allows the pins 25 to limit the rotation of the tubular member 23 in relation to the output shaft 21.

Thus, upon relative rotation of the input shaft 20 and the output shaft 21, the tubular member 23 rotates in relation to the input shaft 20, while travelling in the axis direction in accordance with the direction of the rotation because the tubular member 23 and the input shaft 20 are screw-coupled.

The two pins 25 allow the tubular member 23 to stably rotate in relation to the input shaft 20 as explained above such that the tubular member 23 does not produce twisting.

On the outer circumference of the tubular member 23, an annular-shaped ring member 26 made up of a magnet is secured. In the gear case 19 facing the ring member 26, magnetically sensitive devices 27 are implanted as a pair at opposite positions shifting in a phase of 180 degrees. The pair of magnetically sensitive devices 27 has a function of detecting a magnetic flux from the ring member 26 and outputting the detected value as variations in voltage.

The magnet used in the first embodiment may be a magnet which generates a magnetic flux, for example, a permanent magnet, an electromagnet using a coil made of a magnetic material or non-magnetic material, and so on.

For the magnetically sensitive device 27, a hall device, magnetic resistor element or the like can be used.

Figure 4:
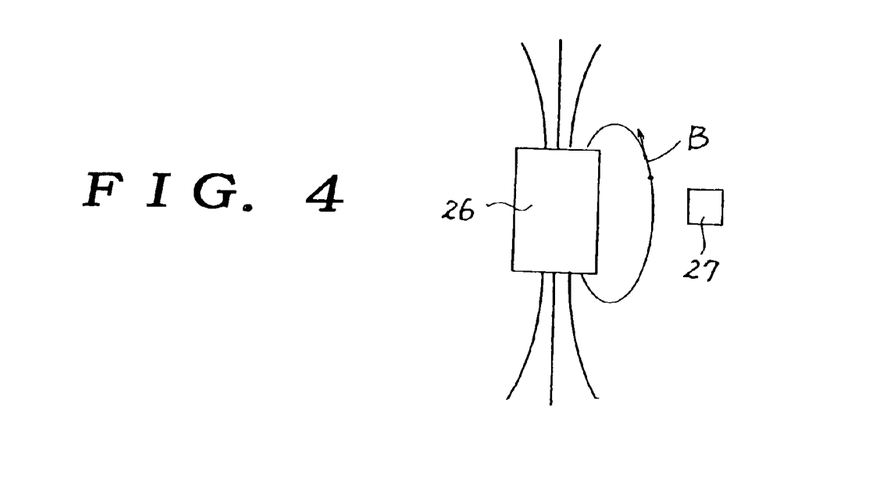
FIG. 4 is a schematic diagram illustrating a relationship between a ring member 26 and a magnetically sensitive device 27.
Figure 5:
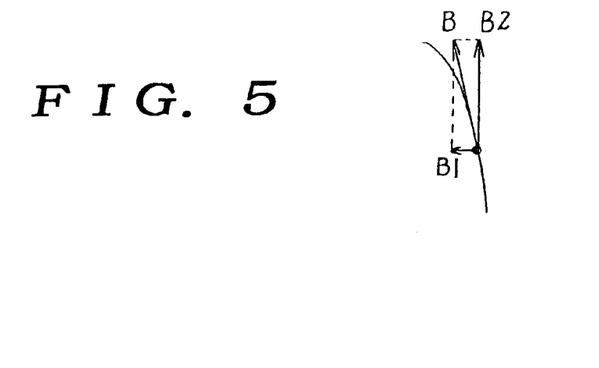
FIG. 5 is a diagram illustrating a relationship between a horizontal component B1 and a vertical component B2 of a magnetic flux B.

FIG. 4 is a schematic diagram illustrating the relationship between the ring member 26 and the magnetically sensitive device 27. As illustrated in FIG. 4, magnetic flux are released from the ring member 26, and have different curvatures depending on their individual positions. Accordingly, a magnitude and an angle of the magnetic flux in the tangential direction are varied depending on the detecting positions. Magnitude B of the magnetic flux in the tangential direction can be divided into a horizontal component B1 and a vertical component B2 as illustrated in FIG. 5. The magnetically sensitive device 27 detects only the horizontal component B1 of the magnetic flux and outputs the detected value as a voltage.

Since the horizontal component B1 of the magnetic flux becomes zero at the midpoint of the ring member 26 in the axis direction, the midpoint is set as a neutral position.

The tubular member 23 is installed to align the neutral position of the ring member 26 with the detecting position of the magnetically sensitive device 27.

Figure 6:
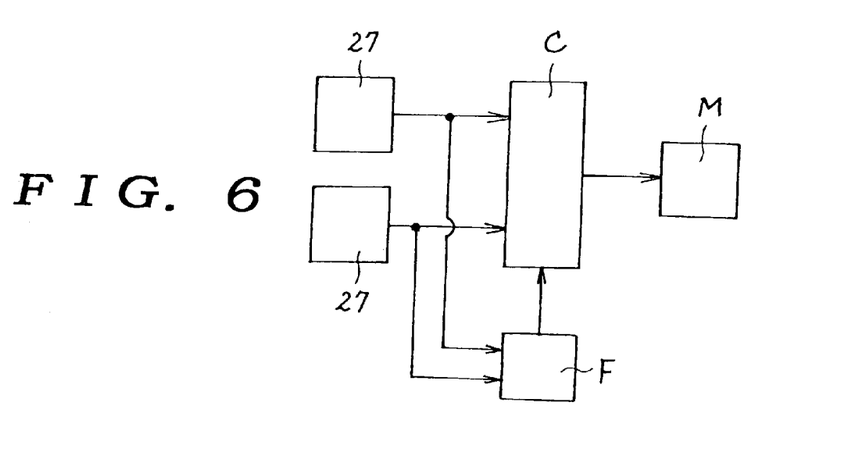
FIG. 6 is a circuit diagram of the torque detector of the first embodiment.

With the above configuration, as the tubular member 23 travels from the neutral position toward the axis direction, the horizontal component B1 of a magnetic flux at the detecting position increases. The magnetically sensitive device 27 detects the horizontal component B1 of the magnetic flux and outputs the resulting signal to a controller C and a fail detecting mechanism F as illustrated in FIG. 6.

Next, the operation in the first embodiment will be described.

During the state that load is transmitted from wheels (not shown) to the output shaft 21, when a steering wheel (not shown) is turned to rotate the input shaft 20, the input shaft 20 and the output shaft 21 relatively rotate while the torsion bar 22 twists.

Upon the relative rotation of the input shaft 20 and output shaft 21 as explained above, the tubular member 23 slides in the axis direction, thereby to move the ring member 26. When the ring member 26 thus moves in the axis direction, the horizontal component B1 of the magnetic flux facing each magnetically sensitive device 27 varies. The magnetically sensitive devices 27 respectively detect the horizontal components B1 of the magnetic flux and output the resultants as voltage signals Va, Vb to the controller C.

The voltage signals Va, Vb detected by the magnetically sensitive devices 27 are input to the controller C as illustrated in FIG. 6. The controller C averages both the voltage signals Va, Vb and controls the output of the electric motor M based on the averaged signal. The electric motor M controlled by the controller C exerts an assist force to optimize a steering force.

The reason for averaging two signals from the magnetically sensitive devices 27 as explained above is to achieve high safety.

Specifically, in installing or sliding, the tubular member 23 is occasionally inclined to the axis of the gear case 19. If the tubular member 23 is inclined, as a natural consequence, the ring member 26 secured on the tubular member 23 is inclined and the magnetic flux is also inclined. In this event, if the magnetic flux is detected at one position, this increases an error. The error may cause an unexpected assist force.

Therefore, for the detector according to the first embodiment, the two magnetically sensitive devices 27 are located at opposite positions shifting in a phase of 180 degrees, and the detected values are averaged. In this way, even when the tubular member 23 is inclined, the error produced by the inclination can be substantially reduced. Hence, an unexpected assist force can be avoided and high safety is ensured.

In the first embodiment, the average value between the detected values of the two magnetically sensitive devices 27 is found. However, if the number of magnetically sensitive devices 27 is further increased and an average value among the detected values of the increased number of magnetically sensitive devices 27 is found, the detection accuracy for input torque is further improved.

Especially, when the ring member 26 has a magnetic error, i.e. when the magnetic flux vary, it is advantageous to find an average value of many detected values as explained above.

Further, in the use of a plurality of magnetically sensitive devices 27 in this way, the arrangement of the magnetically sensitive devices 27 at regular intervals in the circumferential direction enables the balanced detection, resulting in the improved detection of the input torque with high accuracy.

However, if the precision of installing the tubular member 23 is increased and this can prevent the tubular member 23 from inclining in installing and also in sliding, only one magnetically sensitive device 27 will suffice.

In this case, the number of magnetically sensitive devices 27 is reduced by one, and moreover, it is not needed to provide a calculating unit for averaging the detected values from the magnetically sensitive device 27 in the controller C. This results in a reduced cost.

The controller C averages the two output values Va, Vb of the respective magnetically sensitive devices 27 as discussed above. Therefore, when one of the magnetically sensitive devices 27 fails, or when the tubular member 23 is inclined to the axis of the gear case 19, the controller C cannot determine such a failure or inclination. For example, in an abnormal case where one of the output values Va is ten and the other output value Vb is zero, and in a normal case where both the output values Va, Vb are five, the average values in both cases is five. It is impossible to determine an abnormal state by a failure or the like from such an average value.

Further, it is very dangerous to continue using the one of the magnetically sensitive devices 27 without finding the failure thereof.

Hence, the signals from the magnetically sensitive devices 27 are additionally input to the fail detecting mechanism F.

The fail detecting mechanism F calculates to subtract one of the output values from the other output value, |Va−Vb|. When the calculated result exceeds a predetermined value, the fail detecting mechanism F determines the abnormal state and outputs a fault signal to the controller C.

Figure 7:
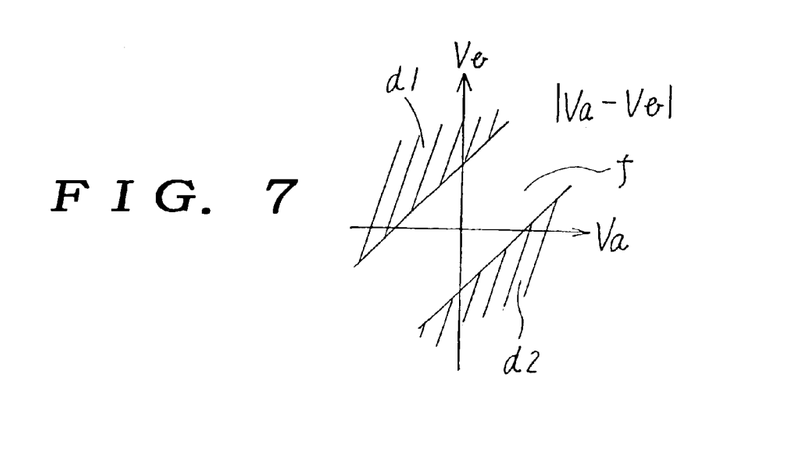
FIG. 7 is a graph illustrating a fail detection area.

FIG. 7 illustrates a graph of the relation |Va−Vb|, in which the non diagonally-shaded area f represents a safe area and the diagonally-shaded areas d1, d2 represent fault areas.

When both the output values of the respective magnetically sensitive devices 27 are normal and equal, the calculated result of |Va−Vb| is within the safe area f. In this case, the signal averaged by the controller C is supplied to the electric motor M as it is.

However, when the calculated result of |Va−Vb| is within the diagonally-shaded fault area d1 or d2, the fail detecting mechanism F supplies the fault signal to the controller C. Upon reception of the fault signal, the controller C determines the fault state, stops the electric motor M, and switches to the manual steering mode. Thus, safety is maintained.

It should be noted that the safe area f is instituted in the fail detecting mechanism F for treating a small difference resulting from the above calculation as a tolerance.

In the first embodiment, the difference between the only two magnetically sensitive devices 27 is found. However, the more than two magnetically sensitive devices 27 can be provided and the differences among the output values of the more than two magnetically sensitive devices 27 may be found. In this case, the fail detection can be achieved with an improved degree of reliability, resulting in further safety.

Next, when the input shaft 20 and the output shaft 21 integrally rotate while the torsion bar 22 is twisted, the tubular member 23 rotates in relation to the gear case 19. In this case, the provision of the ring member 26 of an annular shape on the outer circumference of the tubular member 23 allows the magnetically sensitive devices 27 to detect the magnetic flux at all times.

In other words, with the detector of the first embodiment, the amount of relative rotation of the input shaft 20 and output shaft 21 corresponding to the input torque is converted into the amount of travel of the tubular member 23 in the axis direction. Furthermore, even when the input shaft 20 and the output shaft 21 integrally rotate while maintaining an amount of relative rotation, the amount of travel of the tubular member 23 can be detected by the annular shaped ring member 26. In consequence, the planetary gear unit which is absolutely needed in the conventional torque detectors discussed in DESCRIPTION OF RELATED ART is not required, resulting in reduction in size of the gear case 19.

Further, since the ring member 26 is out of contact with the magnetically sensitive devices 27, there is no significant influence of wear and the like produced in use of a contact type sensor. This allows the detection of high accurate values.

Figure 8:
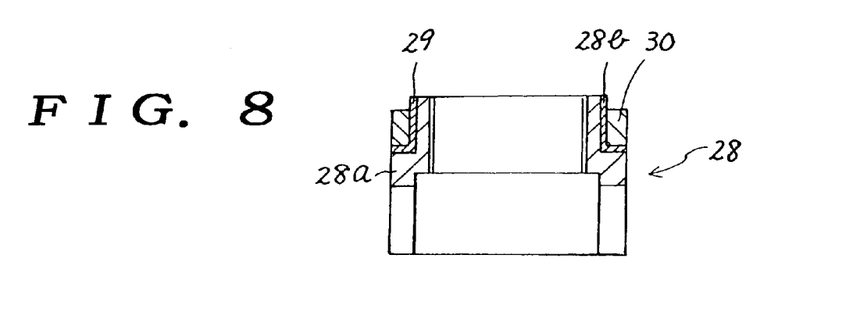
FIG. 8 is a sectional view illustrating a tubular member 28 according to a second embodiment.
Figure 9:
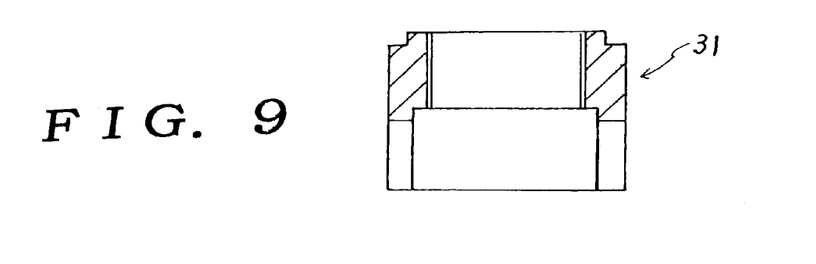
FIG. 9 is a sectional view illustrating a tubular member 31 according to a third embodiment.

In second and third embodiment illustrated in FIG. 8 and FIG. 9, the structure of the tubular member 23 of the first embodiment is changed.

A tubular member 28 according to the second embodiment illustrated in FIG. 8 has a tubular main body 28a made up of metal and an annular-shaped step portion 28b to which a holding tube 29 made up of a non-magnetic material is secured. An annular-shaped ring member 30 is secured on the outer circumference of the holding tube 29.

The reason why the ring member 30 is secured to the tube main body 28a through the holding tube 29 made up of the non-magnetic material is as follows: if the ring member 30 is secured directly to the tube main body 28a, the tube main body 28a bears a magnetic force. This effects a variation in a magnetic flux of the ring member 30. As a result, there is a problem in which the amount of travel cannot be detected precisely.

According to the second embodiment, since the holding tube 29 made up of the non-magnetic material is interposed between the tube main body 28a and the ring member 30, the above problem does not arise. Moreover, the robust metal made-tube main body 28a has long life.

On the other hand, in the third embodiment illustrated in FIG. 9, a tubular member 31 itself is made up of a magnet.

With the above configuration of the third embodiment, the simple structure of the tubular member 31 allows the reduction in cost thereof.

In this case, since the tubular member 31 is different in shape from those of the corresponding ring members 26 and 30 of the first and second embodiment, the magnetic flux is also different. However, the controller C for detecting the magnetic flux can correct the difference. Accordingly, even in use of the tubular member 31 itself made up of a magnet, precise torque can be detected.

Figure 10:
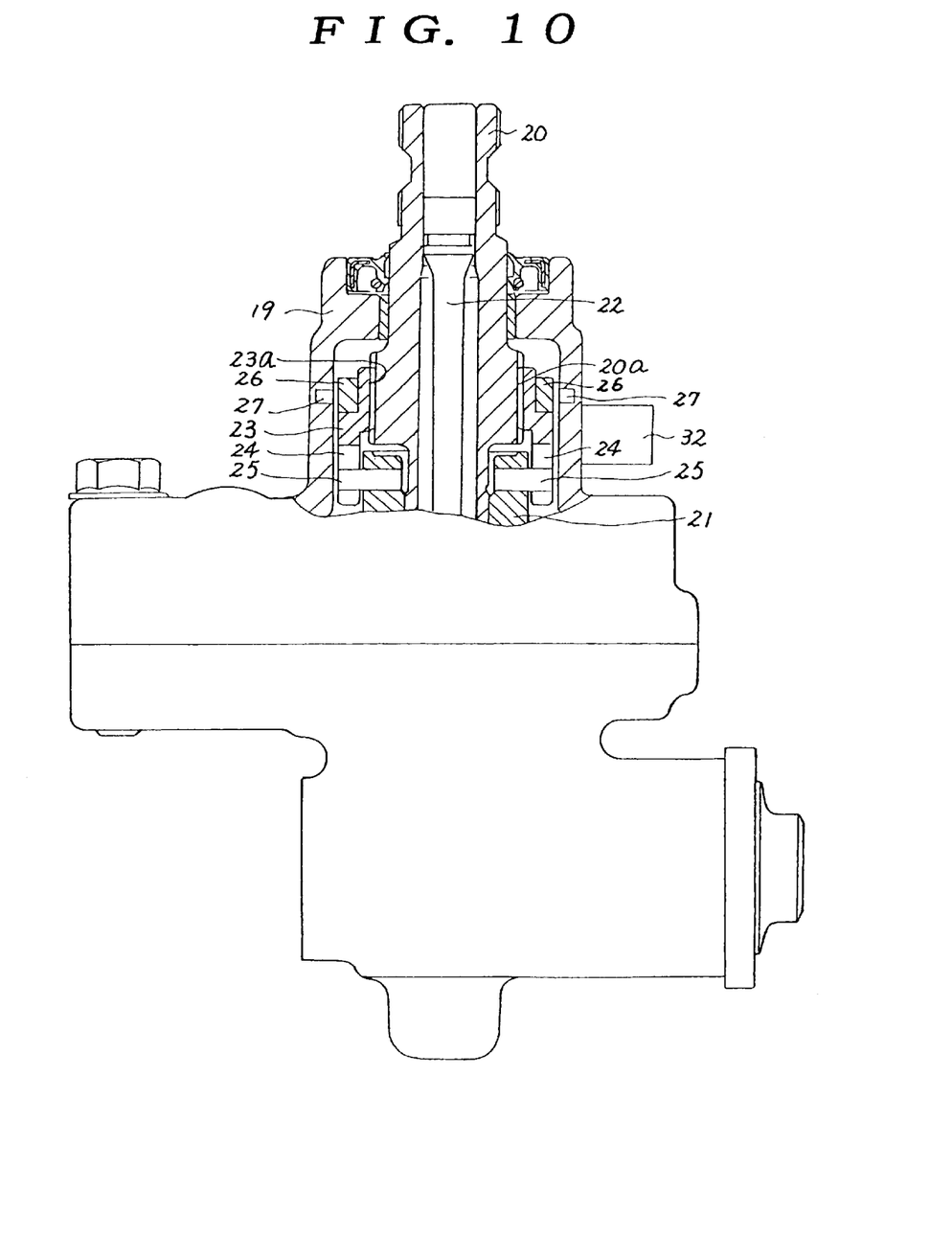
FIG. 10 is a sectional view illustrating a torque detector according to a fourth embodiment.
Figure 11:
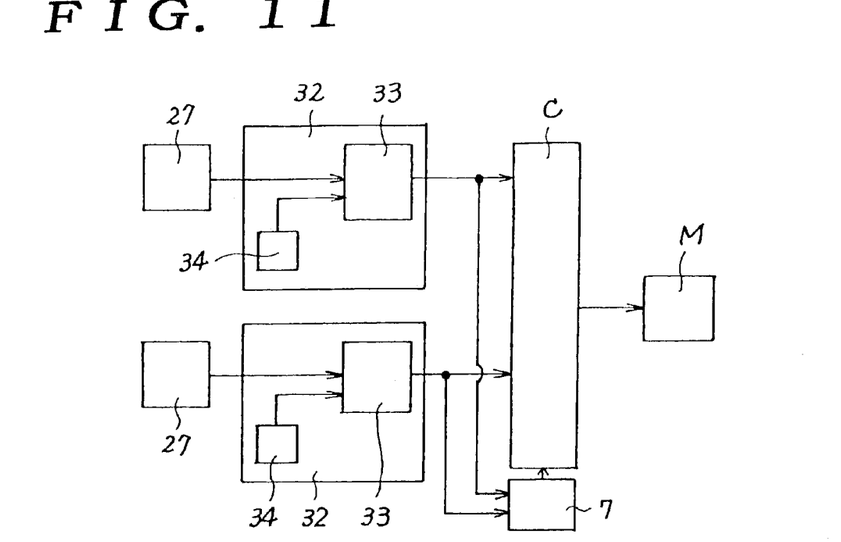
FIG. 11 is a circuit diagram of the torque detector according to the fourth embodiment.

In a fourth embodiment illustrated in FIG. 10 and FIG. 11, adders 32 are secured on the gear case 19, and each is connected between the magnetically sensitive device 27 and the controller C. The remaining configuration is the same as that of the first embodiment.

In the neutral state, when the voltage signals Va, Vb supplied from the magnetically sensitive devices 27 are not zero representing the neutral state, the adders 32 alter the signals to zero for correction and output them to the controller C.

Specifically, each adder 32 is composed of an adding section 33 and an offset voltage setting section 34. The adder 32 inputs a voltage signal Va, Vb, being set in the offset voltage setting section 34, to a voltage signal input from the magnetically sensitive device 27 to the adding section 33.

For example, in the neutral state, when the voltage signal Va, Vb supplied from the magnetically sensitive device 27 to the adding section 33 is smaller than zero, the offset voltage setting section 34 adds the shortage to increase an output voltage to zero. When the voltage signal Va, Vb input to the adding section 33 is larger than zero, a negative voltage signal Va, Vb is output to reduce an output voltage to zero.

The reason for correcting the output signal in the adder 32 as explained above is as follows: in the case that the voltage signal Va, Vb supplied from the magnetically sensitive device 27 is set as, e.g. zero in the neutral state, when the input torque is zero, the voltage signal Va, Vb must become also zero.

However, parts for the input shaft 20, output shaft 21, tubular member 23 and so on have variations in sizes, and mounting errors are produced in mounting the parts. Therefore, it is extremely difficult to set the neutral state with precision. If the ring member 26 is inclined as explained above, the voltage signals Va, Vb supplied from the magnetically sensitive devices 27 may not be zero despite the neutral state.

In the fourth embodiment, therefore, when the output voltage from the magnetically sensitive device 27 is not zero notwithstanding that the neural state has been set in the assembling process of the detector, the adder 32 corrects the deviation.

According to the torque detector of the fourth embodiment, if the output signal supplied from the magnetically sensitive device 27 in the neutral state is deviated, the deviation can be effortlessly corrected by adjusting the adder 32. Accordingly after the input shaft 20, output shaft 21, tubular member 23 and so on are mounted in the gear case 19, it is not necessary to disassemble the gear case 19 for the adjustment.

It should be mentioned that it might be possible to automatically correct the deviation of the neutral position using the controller C instead of the adders 32. In this case, however, when the gear case 19 is required to replace due to a failure or the like, the controller C must be also replaced.

However, in the torque detector of the fourth embodiment, since the adder 32 independent of the controller C corrects the deviation of the neutral position, the replacement of controller C is not needed. Accordingly, costs for replacing can be reduced.

EXPLANATION OF CODES

| | |
|---|---|
| 20 | INPUT SHAFT |
| 21 | OUTPUT SHAFT |
| 23, 28, 31 | TUBULAR MEMBER |
| 26 | RING MEMBER |
| 27 | MAGNETICALLY SENSITIVE DEVICE |
| 29 | HOLDING TUBE |
| 32 | ADDER |
| C | CONTROLLER |
| F | FAIL DETECTING MECHANISM |

What is claimed is:

1. A torque detector for detecting input torque from the amount of relative rotation of an input shaft, linking with a steering wheel, and an output shaft linking with wheels, and supplying the detected signal to a controller, said torque detector comprising:

a conversion member having at least one groove, said conversion member arranged about outer circumferences of the input shaft and the output shaft to convert the amount of relative rotation of the input and output shafts to a displacement in an axial direction, said at least one groove being structured and arranged to receive at least one pin, said at least one pin coupled to the output shaft and being slidably fitted thereon;

an annular-shaped ring member formed of a magnet and secured on the outer circumference of said conversion member; and a plurality of magnetically sensitive devices arranged at intervals around said ring member to oppose each other, wherein said magnetically sensitive device detects the amount of travel of said ring member in the axial direction and supplying the detected amount as a voltage signal to the controller.

2. The torque detector according to claim 1, wherein said magnetically sensitive devices are connected to a fail detecting mechanism, and the fail detecting mechanism detects a difference between the voltage signals supplied from the magnetically sensitive devices and supplies a fault signal to the controller when the difference exceeds a set value.

3. The torque detector according to claim 1 wherein a plurality of said magnetically sensitive devices are arranged around said ring member, and the controller averages the detected signals supplied from said magnetically sensitive devices.

4. The torque detector according to claim 3, wherein a plurality of said magnetically sensitive devices are arranged at regular intervals in the circumferential direction.

5. The torque detector according to claim 1 wherein said conversion member is a tubular member.

6. The torque detector according to claim 5, wherein said ring member is secured on said tubular member made of metal and a non-magnetic substance is interposed between the tubular member and the ring member.

7. A torque detector for detecting input torque from the amount of relative rotation of an input shaft linking with a steering wheel and an output shaft linking with wheels, and supplying the detected signal to a controller, said torque detector comprising:

a conversion member made up of a magnet, said conversion member having at least one groove, and said conversion member being arranged about outer circumferences of the input shaft and the output shaft to convert the amount of relative rotation of the input and output shafts to a displacement in an axial direction, said at least one groove being structured and arranged to receive at least one pin, said at least one pin coupled to the output shaft and being slidably fitted thereon;

a plurality of magnetically sensitive devices arranged at intervals around said conversion member to opposite each other;

a fail detecting mechanism connected to said magnetically sensitive devices, wherein said magnetically sensitive device detects the amount of travel of said conversion member in the axis direction and supplying the detected amount as a voltage signal to the controller, while said fail detecting mechanism detects a difference between the voltage signals supplied from the magnetically sensitive devices and supplies a fault signal to the controller when the detected difference exceeds a set value.

8. The torque detector according to claim 1 further comprising an adder connected between said magnetically sensitive device and the controller to correct a deviation of an output signal from the magnetically sensitive device in a neutral state.

9. The torque detector according to claim 7, further comprising an adder connected between said magnetically sensitive device and the controller to correct a deviation of an output signal from the magnetically sensitive device in a neutral state.

* * * * *